Feb. 3, 1959
E. JONES
2,872,154
THERMOSTATIC CONTROL VALVE
Filed Aug. 25, 1954
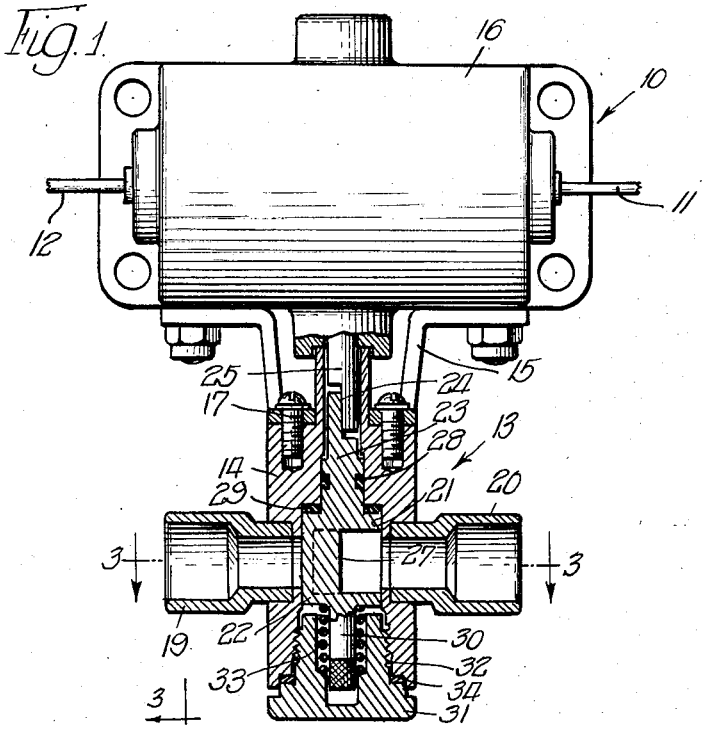
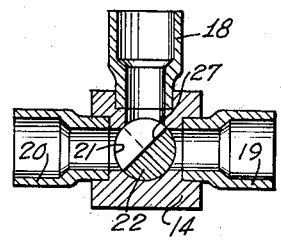
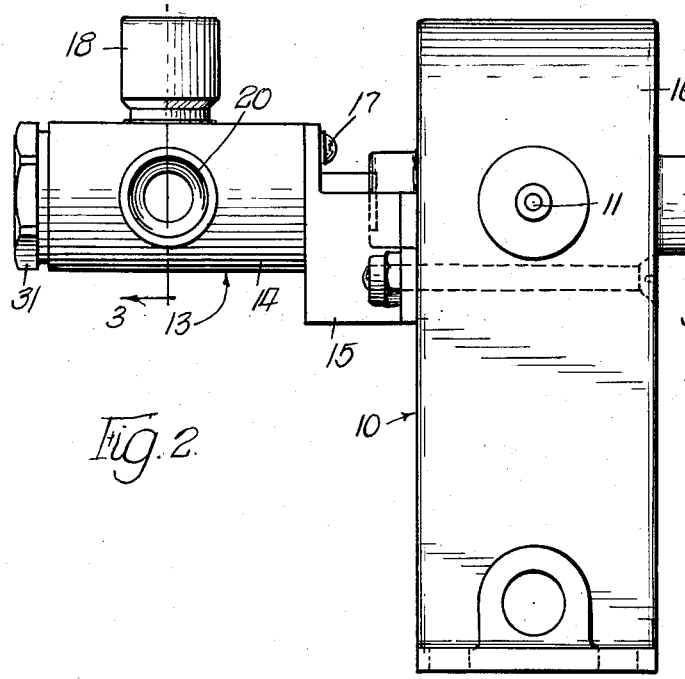
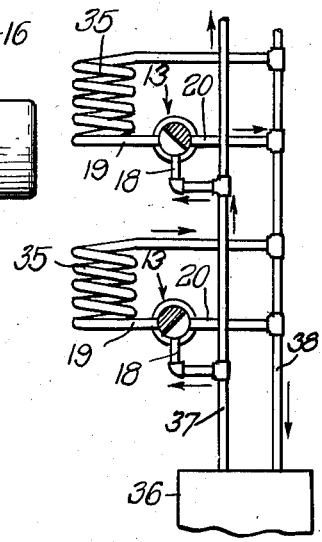
INVENTOR.
Evan Jones,
BY
Cromwell, Greist & Warden
Attys

United States Patent Office 2,872,154
Patented Feb. 3, 1959

2,872,154

THERMOSTATIC CONTROL VALVE

Evan Jones, Evanston, Ill., assignor to Henry Valve Company, Incorporated, Melrose Park, Ill., a corporation of Illinois Application August 25, 1954, Serial No. 452,062

2 Claims. (Cl. 251—133)

The present invention relates to an improved thermostatically controlled valve unit featuring a motor operated valve. An essential characteristic of the unit is that a rotary-type valve component thereof is intermittently or periodically actuated between open and closed positions by a special electrical motor, which motor is responsive to and under the control of a thermostat. The function of the valve is, in an important adaptation thereof, to govern fluid flow from a main supply line into an individual outlet constituting part of a fluid circulatory system, and in this aspect the valve has unique suitability for use in considerable numbers in a large, multiple outlet installation.

A good example is the room heating or cooling system of a modern hotel or office building, in which a large number of rooms each has an individual space heating or cooling unit governed by one of the improved control valve constructions. In the past, this has been done by the use of thermostatically controlled solenoid-type valves. However a serious, and as yet uncured, objection to this sort of control resides in the excessive noise of operation of the solenoid valves. Moreover, they have a tendency to set up a water hammer condition, which is even more objectionable.

Accordingly, the invention provides a flow control unit which avoids these difficulties for the reason that the valve element thereof governing flow of a heat transfer medium, as through an individual heat exchange unit, is a rotary one, operated by a partial revolution electrical motor. The valve itself is of very simple, compact construction and the motor is small and inexpensive. It operates on a shaded pole principle to produce a partial rotation of a coaxial, specially connected, plug-type valve element, for example upon demand and satisfaction of a room thermostat. In a typical installation, opening of the valve will cause a heating or cooling flow through a room radiator or evaporator coil, and when the requirement of the thermostat is met, restorative rotation of the valve to a closed condition will cause the flow of fluid to be by-passed in respect to the individual heat exchange unit.

Details of the valve construction per se also involve improvements in regard to desirable features of removability, especially bearing on the driving connection between its rotative plug-type valve element and the shaft of the control motor. To this end, the valve plug has a rearward shaft extension which is provided with a 180° flat engaging a corresponding flat on the outer end of the partial revolution motor. The lapped fit gives assurance that the valve element, when being replaced after removal for inspection, servicing, etc., cannot be incorrectly engaged with the motor shaft, hence cannot be angularly misaligned in relation to the valve controlled flow passages of the valve body.

Removal of the valve element for the purposes referred to above is effected very simply by simply unscrewing an external closure plug applied coaxially of a cylindrical valve chamber of the valve body, whereupon the cylindrical valve plug may be manually removed endwise by grasping a knurled axial extension thereof and pulling. The entire valve assembly, including the plug, bearing provisions and sealing rings then slips out as a unit, and is replaced with equal ease and expedition. This is done without in any way altering the physical relation of the valve body to the motor, to which it is rigidly but removably secured.

By the same token, if it is desired to disconnect the motor and valve body, this can be readily done, due to the removable securing means referred to. The motor can be disconnected in its entirety from the valve unit without disturbing the fluid connections of the latter in the slightest.

The foregoing statements are indicative in a general way of the nature of the invention. Other and more specific objects will be apparent to those skilled in the art upon a full understanding of the construction and operation of the improved valve-motor assembly and the improved valve component thereof.

A single embodiment of the invention is presented herein for purpose of illustration. It will be apparent that the invention may be incorporated in other modified forms coming equally within the scope of the appended claims.

In the drawings:

Fig. 1 is a fragmentary top plan view, partially broken away and in horizontal cross section through the valve component of the unit, illustrating basic operating details of the latter;

Fig. 2 is a view in side elevation further illustrating the general arrangement of parts of the combined motor-valve unit;

Fig. 3 is a view in vertical cross section through the valve unit, upon a line corresponding to line 3—3 of Fig. 1; and Fig. 4 is a schematic diagram indicating the manner of using motor operated control valves in accordance with the invention in the regulation of flow through a multiplicity of heat exchange units, as a typical installation of the improved valve construction.

Referring first to Figs. 1 and 2 of the drawings, the reference numeral 10 in general indicates a small electric motor of the shaded pole type, operated under the control of a conventional thermostat (not shown) from a 110 v. source. This motor is desirably of the type illustrated and described in the patents to Drake 2,123,-182, of July 12, 1938, or Crise et al. 2,134,685, dated November 1, 1938, or 2,230,612, dated February 4, 1941. Details of construction of this partial rotation motor unit constitute no part of the present invention, other than in reference to its characteristic operation of the valve, hence are illustrated or described only in limited reference to the shaft coupling of the motor. It suffices to say that under electrical energization through lead 11, under the control of a thermostat, the motor lead of which is designated 12, the motor rotates 90° and thereby rotatively opens or closes, as determined by the particular installation, the special three-way valve unit 13 of the invention. When the demand of the thermostat is met, motor 10 restores the valve to original position, actually through the same arc and in the reverse direction.

As pointed out above, it is contemplated in a typical large scale installation to provide an individual, thermostatically regulated or operated motor-valve unit for each of the individual rooms or room combinations of a hotel or like establishment, the room heat exchange units being operated in association with common fluid supply and return lines. However, the motor-valve assembly obviously has great adaptability for other installations, both in multiple or as a single control unit. In either setting the unit presents the same advantages, particularly in respect to silence and reliability of control. It is also evident that although an ideal installation will rely upon thermostatic regulation, this is not of itself controlling.

Value unit 13 comprises a hollow external valve body 14 which is removably secured on a bracket 15 attached to the housing 16 of motor 10, as by a plurality of screws 17. An inlet fitting 18 (Fig. 3), an outlet fitting 19, adapted to be connected to a room heat exchange unit, for example, and a return fitting 20 are associated with the valve body in the manner of any three-way valve construction. Each communicates with an internal cylindrical chamber 21 of the valve body, whose axis is at 90° to the axes of the respective fittings.

A cylindrical valve plug 22 is snugly received coaxially in chamber 21 for rotation therein, and a rear stem extremity 23 on this member is machined at 24 to provide a 180° flat which is in releasable driving engagement with a similar 180° flat on the outwardly projecting shaft 25 of motor 16. This lapped shaft coupling prevents incorrect re-engagement of the plug 20 and motor shaft following removal of the former for inspection, etc. Hence the angular relationship of valve plug 22, and more particularly of a semicircular valve channel 27 thereof which is aligned with the respective fittings 18, 19 and 20, is always the same in reference to those fittings when the shaft 25 is drivingly re-engaged after removal of the valve plug.

Rearward valve stem 23 serves as one of the bearings for the valve plug in body 14 and is provided with an annular groove in which an O-ring sealing element 28 is received in sealing relation to the cylindrical bore of valve body 14. A further sealing gasket 29 surrounds the stem in face abutment with one end of the valve plug proper, and at the opposite end thereof, the plug is provided with a forwardly projecting, knurled stem 30 which is manually grasped when it is desired to remove the valve plug, bearing and sealing assembly from the body. This is done upon removal of a closure disk 31 threadedly applied to an outwardly opening counterbore 32 of body 14. A coil spring 33 acts between closure 31 and rotatable valve plug 22 to maintain end sealing thrust on the latter, sealing gasket 34 being compressed between the plug and the valve body.

In the operation of the improved valve in a multiple outlet system, assuming the temperature, for example in a given room or other space to be controlled, is proper under the setting of its thermostat, the valve 13 will be in the closed position shown in Fig. 1 and in solid line in Fig. 3. Accordingly, a fluid supplied to its inlet fitting 18, as in a liquid circulatory system shown in Fig. 4, will be by-passed about a heat exchange unit such as an evaporator or radiator coil, comprehensively designated 35, in the space in question. It will flow in a circuit from a generator such as a condenser or boiler, comprehensively designated 36, through a common supply or outgoing line 37, fitting 18, return fitting 20 and a common return line 38 to the generator unit, as indicated by arrows in Fig. 4. No flow occurs through coil 35 (considering the lowermost of the two illustrated valves). If the requirements of the thermostat are not satisfied, in the temperature of the space regulated, the motor 10 will be set in operation through lead 12 and act to rotate the valve plug 90° from the solid line position of Fig. 3 to that indicated in dotted line, whereupon fluid will flow from supply line 37 through inlet fitting 18, valve passage or channel 27, supply fitting 19, thence through the heat exchange unit 35 (as depicted at the top of Fig. 4), returning them to compressor or boiler return line 38. When the requirements of the thermostat are satisfied, motor 16 rotates the same extent in the reverse direction, restoring the valve to the position shown in solid line in Fig. 3.

The combined motor-valve control unit is absolutely noiseless in operation, as emphatically distinguished from the annoying clicking operation of existing types of solenoid valve controls for the same purpose. It is relatively inexpensive in construction, considering the important advantages derived from motor control. It is notable for the ease of servicing which it makes possible, by the simple removal and insuredly proper replacement of plug 22 in the fashion described. If it is desired to service motor 10, this is readily accomplished by disconnecting the motor from the valve body 14, and incorrect replacement is again impossible due to the lapped shaft coupling. Upon removal of valve port 22, all of the sealing provisions such as O-ring 28 and gasket 29, are removed therewith as a unit, to be inspected and replaced if desired.

I claim:

1. A motor-controlled valve assembly comprising a reversing motor suitably housed with the output shaft thereof drivingly engaged with the stem of a valve element removably carried in a vlave body attached to the housing of said motor, said valve body having a valve chamber with a plurality of fluid flow passages opening thereinto, said valve body have oppositely positioned openings therein communicating with said valve chamber and axially aligned with said output shaft, one of said openings receiving said valve stem therein in driving engagement with said output shaft, the junction of said one opening and said valve chamber defining a seat against which said valve element is urged, the other of said openings being closed by a removable closure member provided with means received in said other opening and in engagement with said valve element to urge the same against said seat and hold the same in driving engagement with said output shaft, said other opening being of greater diameter than said valve element to permit ready withdrawal of said valve element therethrough from said valve chamber and out of said valve body upon removal of said closure member, said output shaft and stem having axially overlapping drive coupling end portions in the form of semi-cylindrical projections arranged in side-by-side relation with single juxtapositioned face portions thereof provided with engaged flatted surfaces establishing single positional coupling of said shaft and stem to prevent incorrect re-engagement of said shaft and stem and incorrect rotational positioning of said valve element in said valve body upon re-insertion of said valve element in said valve body following withdrawal thereof for maintenance purposes.

2. The motor-controlled valve assembly of claim 1 wherein said valve element is further provided with a removal stem projecting substantially into said other opening and said means constitutes a compressed spring seated by said closure member at one end and extending about said removal stem into seating engagement with said valve element at the other end.

References Cited in the file of this patent

UNITED STATES PATENTS

| | | |
|---|---|---|
| 1,373,469 | Warner | Apr. 5, 1921 |
| 1,463,188 | Allan | July 31, 1923 |
| 1,628,530 | Burnett | May 10, 1927 |
| 1,668,168 | Nordstrom | May 1, 1928 |
| 1,816,012 | Heins | July 28, 1931 |
| 1,887,344 | Wise | Nov. 8, 1942 |
| 1,964,782 | Bard | July 3, 1934 |
| 2,414,749 | Lorraine | Jan. 21, 1947 |

FOREIGN PATENTS

| | | |
|---|---|---|
| 435,083 | Great Britain | Sept. 13, 1935 |
| 530,245 | Great Britain | Dec. 9, 1940 |